US011799102B2

(12) United States Patent
Toida et al.

(10) Patent No.: US 11,799,102 B2
(45) Date of Patent: Oct. 24, 2023

(54) FUEL CELL SYSTEM AND CONTROL METHOD OF THE SAME

(71) Applicant: TOYOTA JIDOSHA KABUSHIKI KAISHA, Toyota (JP)

(72) Inventors: Masashi Toida, Nagoya (JP); Yusuke Nishida, Nisshin (JP); Hiroyuki Tsunekawa, Seto (JP); Masahiro Ito, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 130 days.

(21) Appl. No.: 17/182,297

(22) Filed: Feb. 23, 2021

(65) Prior Publication Data

US 2021/0376344 A1 Dec. 2, 2021

(30) Foreign Application Priority Data

May 28, 2020 (JP) .................................. 2020-093177

(51) Int. Cl.
*H01M 8/04223* (2016.01)
*H01M 8/04119* (2016.01)
(Continued)

(52) U.S. Cl.
CPC ....... *H01M 8/04231* (2013.01); *H01M 8/043* (2016.02); *H01M 8/04029* (2013.01);
(Continued)

(58) Field of Classification Search
CPC ......... H01M 8/04156; H01M 8/04164; H01M 8/04171; H01M 8/04179; H01M 8/04228; H01M 8/04231; H01M 8/04253; H01M 8/04303; H01M 8/0432; H01M 8/04328; H01M 8/04335; H01M 8/04343; H01M 8/0435; H01M 8/04358; H01M 8/04365; H01M 8/04701; H01M 8/04708; H01M 8/04716; H01M 8/04723; H01M 8/04731; H01M 2250/30; H01M 8/04225; H01M 8/04302; H01M 8/04843; H01M 8/04828;
(Continued)

(56) References Cited

U.S. PATENT DOCUMENTS

2011/0003215 A1 1/2011 Tanaka et al.
2016/0133963 A1 5/2016 Naganuma et al.
(Continued)

FOREIGN PATENT DOCUMENTS

JP 2016091885 A 5/2016
JP 2017010904 A 1/2017
WO 2008/056617 A1 5/2008

*Primary Examiner* — Matthew W Van Oudenaren
(74) *Attorney, Agent, or Firm* — Dickinson Wright, PLLC

(57) ABSTRACT

A fuel cell system includes: a fuel cell; a temperature acquisition unit that acquires a temperature at a specific position in a vehicle equipped with the fuel cell system; a purge unit that purges the fuel cell when an operation of the fuel cell is stopped; and a control unit that acquires the temperature at the specific position from the temperature acquisition unit at least once from when the fuel cell system is stopped until the fuel cell system is started again, and uses the temperature at the specific position to determine whether purging at a stop by the purge unit is necessary when the fuel cell system is stopped next.

1 Claim, 6 Drawing Sheets

(51) Int. Cl.
*H01M 8/0432* (2016.01)
*H01M 8/04029* (2016.01)
*H01M 8/043* (2016.01)
*H01M 8/04694* (2016.01)
*H01M 8/04228* (2016.01)
*H01M 8/04955* (2016.01)

(52) U.S. Cl.
CPC ..... *H01M 8/0432* (2013.01); *H01M 8/04179* (2013.01); *H01M 8/04358* (2013.01); *H01M 8/04694* (2013.01); H01M 8/04156 (2013.01); H01M 8/04228 (2016.02); H01M 8/04955 (2013.01); H01M 2250/20 (2013.01)

(58) Field of Classification Search
CPC ......... H01M 8/04835; H01M 8/04492; H01M 8/045; H01M 8/04507; H01M 8/04514; H01M 8/04522; H01M 8/04955; H01M 2250/20
See application file for complete search history.

(56) References Cited

U.S. PATENT DOCUMENTS

2016/0380282 A1* 12/2016 Maruo .................... B60L 58/31
429/414
2018/0026280 A1* 1/2018 Hasegawa ......... H01M 8/04544
429/432

* cited by examiner

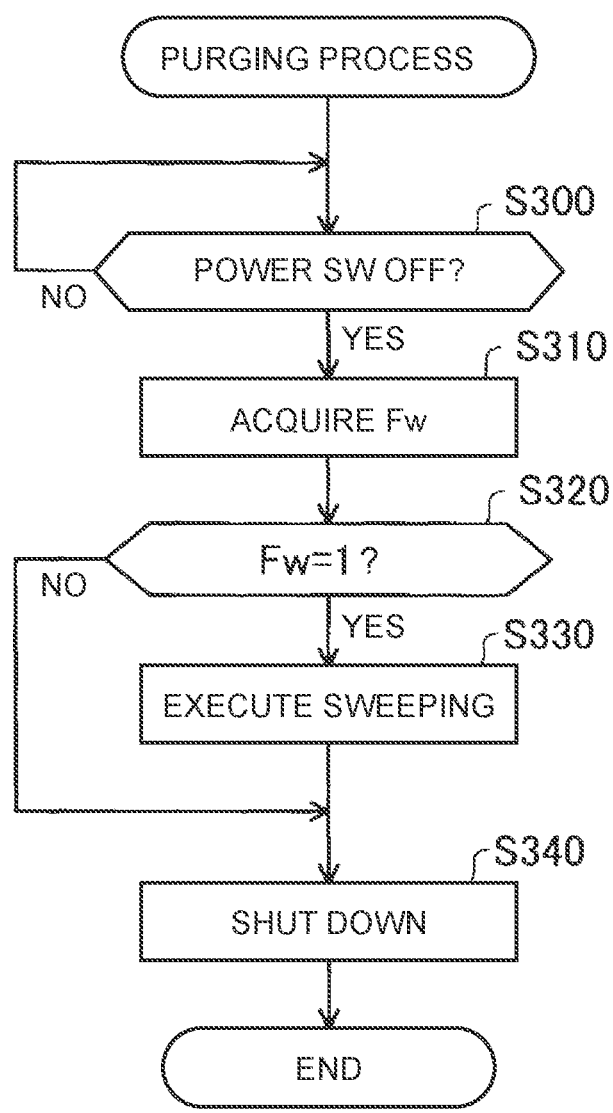

FUEL CELL SYSTEM AND CONTROL METHOD OF THE SAME

CROSS-REFERENCE TO RELATED APPLICATION

This application claims priority to Japanese Patent Application No. 2020-093177 filed on May 28, 2020, incorporated herein by reference in its entirety.

BACKGROUND

1. Technical Field

The present disclosure relates to a fuel cell system and a control method of the fuel cell system.

2. Description of Related Art

Japanese Unexamined Patent Application Publication No. 2017-010904 (JP 2017-010904 A) describes a fuel cell system mounted on a vehicle. The fuel cell system acquires the outside air temperature while the vehicle is traveling, and when purging while the fuel cell system is stopped, the purging is performed with a higher purging capacity when the outside air temperature that is acquired last is equal to or lower than a predetermined threshold value compared to when the outside air temperature that is acquired last is higher than the predetermined threshold value.

SUMMARY

Since the fuel cell system described in JP 2017-010904 A uses the outside air temperature during traveling, there was room for further improvement in the purging process based on the environment in which the fuel cell system is placed, such as when the fuel cell system cools down while stopped.

The present disclosure can be implemented according to the following aspects.

(1) According to an aspect of the present disclosure, a fuel cell system is provided. The fuel cell system includes: a fuel cell; a temperature acquisition unit that acquires a temperature at a specific position in a vehicle equipped with the fuel cell system; a purge unit that purges the fuel cell when an operation of the fuel cell is stopped; and a control unit that acquires the temperature at the specific position from the temperature acquisition unit at least once from when the fuel cell system is stopped until the fuel cell system is started again, and uses the temperature at the specific position to determine whether purging at a stop by the purge unit is necessary when the fuel cell system is stopped next. According to the above aspect, the control unit can predict the temperature of the environment in which the fuel cell system is placed from the temperature at the specific position when the fuel cell system is stopped. When the fuel cell system is stopped next, the control unit can execute the purging process based on the environment in which the fuel cell system is placed.

(2) In the fuel cell system according to the above aspect, the temperature acquisition unit may acquire the temperature at the specific position a plurality of times. In determining whether the purging at the stop is necessary, when a minimum value among a plurality of measured temperatures is equal to or lower than a predetermined determination temperature, the control unit may determine that the purging at the next stop of the fuel cell system is necessary. According to the above aspect, when the minimum value of the temperature at the specific position is equal to or lower than the predetermined determination temperature, the environment in which the fuel cell system is placed can be determined to be, for example, winter.

(3) In the fuel cell system according to the above aspect, the temperature acquisition unit may acquire the temperature at the specific position a plurality of times. In determining whether the purging at the stop is necessary, when using a transition of a plurality of measured temperatures to estimate a minimum value of the temperature at the specific position and the minimum value of the temperature at the specific position that is estimated is equal to or lower than a predetermined determination temperature, the control unit may determine that the purging at the next stop of the fuel cell system is necessary. According to the above aspect, the environment in which the fuel cell system is placed can be estimated from the transition of the temperature at the specific position.

(4) In the fuel cell system according to the above aspect, the determination temperature may be a freezing point of water. According to the above aspect, it is possible to determine whether the environment is such that the water in the fuel cell freezes when the fuel cell system is stopped next.

(5) In the fuel cell system according to the above aspect, the fuel cell system may include a cooling circuit that supplies a cooling medium to the fuel cell. The temperature at the specific position may be a temperature of the cooling medium discharged from the fuel cell in the cooling circuit. The temperature at the position where the cooling medium is discharged from the fuel cell is almost the same as the temperature of the fuel cell. According to the above aspect, the temperature in the fuel cell when the fuel cell system is stopped next can be determined from the temperature of the cooling medium.

(6) In the fuel cell system according to the above aspect, the temperature at the specific position may be the temperature of the fuel cell. According to the above aspect, the temperature in the fuel cell can be directly determined when the fuel cell system is stopped next.

(7) In the fuel cell system according to the above aspect, the specific position may be a position where an outside air temperature of the vehicle is measurable. The temperature in the fuel cell when the fuel cell system is stopped changes under the influence of the outside air temperature. According to the above aspect, the temperature in the fuel cell when the fuel cell system is stopped next can be determined from the outside air temperature.

(8) The fuel cell system according to the above aspect may further include a communication unit configured to communicate with an outside. The fuel cell system may acquire the outside air temperature as the temperature at the specific position from the outside by using the communication unit. According to the above aspect, the vehicle equipped with the fuel cell system does not have to be equipped with a sensor for measuring the outside air temperature.

The present disclosure can be realized in various modes other than the fuel cell system. For example, the present disclosure can be realized in a mode such as a control method of a fuel cell system or a purging method of a fuel cell.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 6 is a flowchart of a purging process.

DETAILED DESCRIPTION OF EMBODIMENTS

Figure 1:
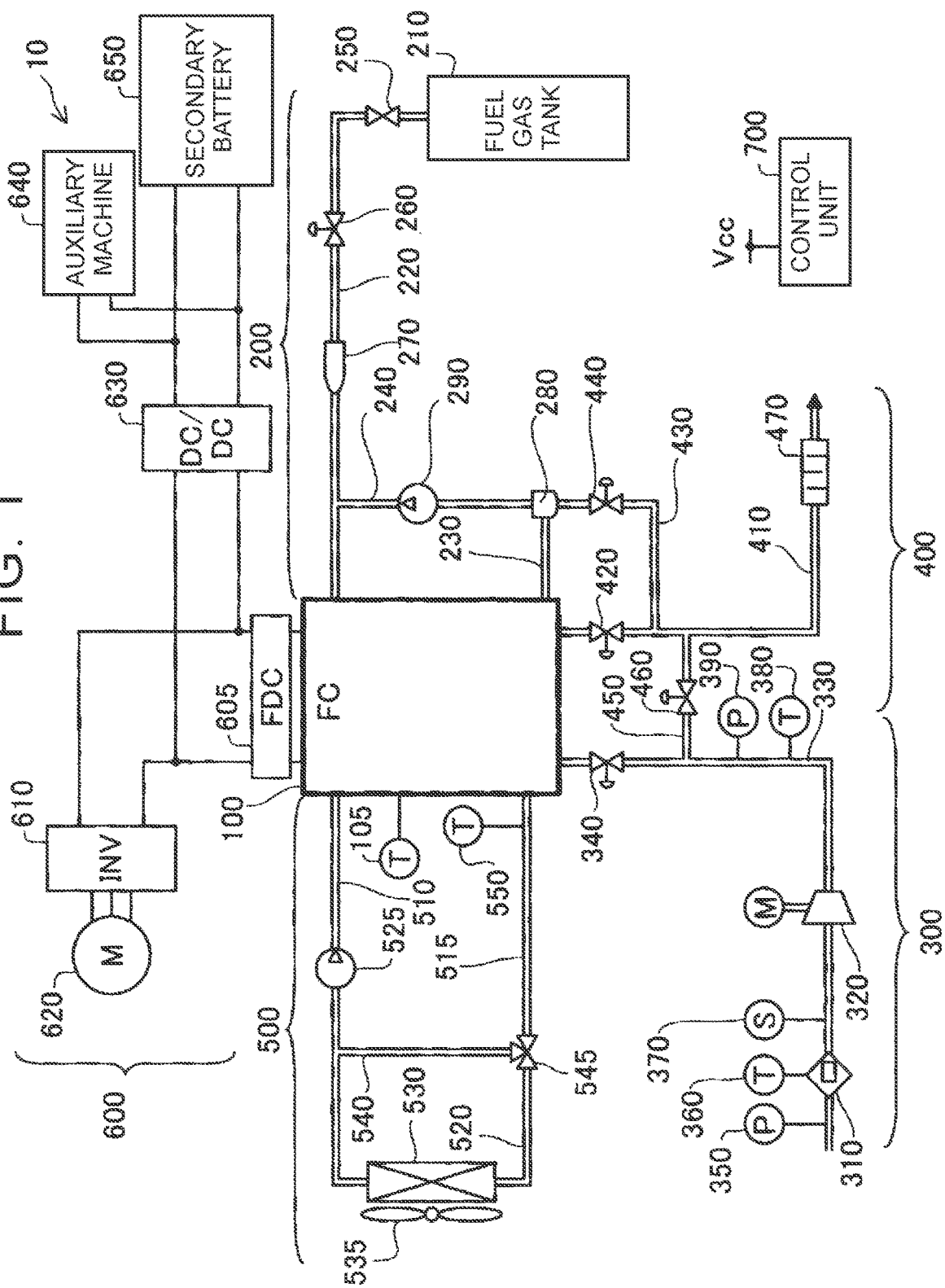
FIG. 1 is a schematic configuration diagram of a fuel cell system.

FIG. 1 is an explanatory diagram schematically showing a fuel cell system 10 used in a vehicle equipped with a fuel cell (also referred to as a "vehicle"). The fuel cell system 10 includes a fuel cell 100, a fuel gas supply circuit 200, an oxidant gas supply circuit 300, an exhaust gas circuit 400, a cooling circuit 500, a load circuit 600, and a control unit 700.

The fuel cell 100 uses the fuel gas and the oxidant gas to generate electric power. In the present embodiment, hydrogen is used as the fuel gas and air (oxygen in the air) is used as the oxidant gas. The fuel cell 100 is provided with a temperature sensor 105 that measures the temperature Tf of the fuel cell 100. The temperature sensor 105 can be omitted.

The fuel gas supply circuit 200 includes a fuel gas tank 210, a fuel gas supply pipe 220, a fuel gas exhaust pipe 230, a fuel gas return pipe 240, a main stop valve 250, a regulator 260, an injector 270, a gas-liquid separator 280, and a hydrogen pump 290. The fuel gas tank 210 stores fuel gas. The fuel gas tank 210 and the fuel cell 100 are connected by the fuel gas supply pipe 220. In the fuel gas supply pipe 220, the main stop valve 250, the regulator 260, and the injector 270 are provided in this order from the fuel gas tank 210 side. The main stop valve 250 turns on and off the supply of fuel gas from the fuel gas tank 210. The regulator 260 adjusts the pressure of fuel gas supplied to the fuel cell 100. The injector 270 injects fuel gas into the fuel cell 100.

The fuel gas exhaust pipe 230 discharges the fuel exhaust gas from the fuel cell 100. The fuel gas return pipe 240 is connected to the fuel gas exhaust pipe 230 and the fuel gas supply pipe 220. The gas-liquid separator 280 is provided between the fuel gas exhaust pipe 230 and the fuel gas return pipe 240. The fuel exhaust gas contains hydrogen that has not been consumed, impurities that have moved through the fuel cell 100 such as nitrogen, and water. The gas-liquid separator 280 separates water from gas (impurities such as hydrogen and nitrogen) in the fuel exhaust gas. The hydrogen pump 290 is provided in the fuel gas return pipe 240. The hydrogen pump 290 supplies the gas separated by the gas-liquid separator 280 to the fuel gas supply pipe 220. In this way, the fuel cell system 10 uses the unconsumed hydrogen contained in the fuel exhaust gas as fuel. In the present embodiment, the hydrogen pump 290 is used, but an ejector may be used instead.

The oxidant gas supply circuit 300 includes an air cleaner 310, an air compressor 320, an oxidant gas supply pipe 330, an inlet valve 340, an atmospheric pressure sensor 350, an outside air temperature sensor 360, an air flow meter 370, a supply gas temperature sensor 380, and a supply gas pressure sensor 390. The air cleaner 310 removes dust in the air when taking in the air. The air compressor 320 compresses the air and sends the air to the fuel cell 100 through the oxidant gas supply pipe 330. The inlet valve 340 is provided in the oxidant gas supply pipe 330 at the inlet to the fuel cell 100. The atmospheric pressure sensor 350 measures the atmospheric pressure. The outside air temperature sensor 360 acquires the temperature of the air before the air is taken into the outside air temperature sensor 360. The air flow meter 370 measures the amount of air taken into the air flow meter 370. The amount of air supplied varies depending on the rotation speed of the air compressor 320. The supply gas temperature sensor 380 measures the temperature of the air supplied to the fuel cell 100, and the supply gas pressure sensor 390 measures the pressure of the air supplied to the fuel cell 100.

The exhaust gas circuit 400 includes an exhaust gas pipe 410, a pressure regulating valve 420, a fuel gas discharge pipe 430, an exhaust drain valve 440, an oxidant gas bypass pipe 450, a bypass valve 460, and a silencer 470. The exhaust gas pipe 410 discharges the oxidant exhaust gas of the fuel cell 100. The exhaust gas pipe 410 is provided with the pressure regulating valve 420. The pressure regulating valve 420 adjusts the pressure of air in the fuel cell 100. The fuel gas discharge pipe 430 connects between the gas-liquid separator 280 and the exhaust gas pipe 410. The exhaust drain valve 440 is provided in the fuel gas discharge pipe 430. The control unit 700 opens the exhaust drain valve 440 to discharge water and gas accumulated in the gas-liquid separator 280 to the exhaust gas pipe 410 when the nitrogen concentration in the fuel exhaust gas becomes high or when the amount of water in the gas-liquid separator 280 increases. The discharged gas contains impurities such as nitrogen and hydrogen. In the present embodiment, the fuel gas discharge pipe 430 is connected to the exhaust gas pipe 410, and the hydrogen in the discharged gas is diluted by the oxidant exhaust gas. The oxidant gas bypass pipe 450 connects a part of the oxidant gas supply pipe 330 on the upstream side of the inlet valve 340 and a part of the exhaust gas pipe 410 on the downstream side of the pressure regulating valve 420. The oxidant gas bypass pipe 450 is provided with the bypass valve 460. When the control unit 700 opens the exhaust drain valve 440 to discharge water and gas (impurities such as nitrogen and hydrogen), the control unit 700 opens the bypass valve 460 and allows air to flow through the exhaust gas pipe 410 to dilute hydrogen. Further, when the electric power required for the fuel cell 100 is small, the control unit 700 opens the bypass valve 460 to reduce the air supplied to the fuel cell 100. The silencer 470 is provided in the downstream portion of the exhaust gas pipe 410 to reduce the exhaust noise. Instead of the inlet valve 340 and the bypass valve 460, a three-way valve may be used at the joint portion between the oxidant gas supply pipe 330 and the oxidant gas bypass pipe 450.

The cooling circuit 500 includes a coolant supply pipe 510, a coolant discharge pipe 515, a radiator pipe 520, a water pump 525, a radiator 530, a bypass pipe 540, a three-way valve 545, and a temperature sensor 550. The coolant supply pipe 510 is a pipe for supplying coolant to the fuel cell 100, and the water pump 525 is provided in the coolant supply pipe 510. The coolant discharge pipe 515 is a pipe for discharging the coolant from the fuel cell 100. The downstream portion of the coolant discharge pipe 515 is connected to the radiator pipe 520 and the bypass pipe 540 via the three-way valve 545. The radiator pipe 520 is provided with the radiator 530. The radiator 530 is provided with the radiator fan 535. The radiator fan 535 blows air to the radiator 530 to facilitate heat radiation from the radiator 530. The downstream portion of the radiator pipe 520 and the downstream portion of the bypass pipe 540 are connected to the coolant supply pipe 510. The temperature sensor 550 measures the temperature Tw of the coolant discharged from the fuel cell 100.

The load circuit 600 includes a fuel cell boost converter 605, an inverter 610, a main drive motor 620, a direct current-to-direct current (DC-DC) converter 630, an auxiliary machine 640, and a secondary battery 650. The fuel cell boost converter 605 boosts the voltage generated by the fuel cell 100 to a voltage capable of driving the main drive motor 620. The inverter 610 converts the boosted direct current (DC) voltage into an alternating current (AC) voltage and supplies the current to the main drive motor 620. The main drive motor 620 is a drive motor that drives a vehicle equipped with a fuel cell. Further, the main drive motor 620 functions as a regenerative motor when the vehicle equipped with the fuel cell is decelerated. The DC-DC converter 630 controls the voltage of the fuel cell 100. Further, the DC-DC converter 630 converts the voltage of the fuel cell 100 and supplies the voltage to the secondary battery 650, or converts the voltage of the secondary battery 650 and supplies the voltage to the inverter 610. The secondary battery 650 is charged with the electric power from the fuel cell 100 and the electric power obtained by regeneration of the main drive motor 620, and also functions as a power source for driving the main drive motor 620 and the auxiliary machine 640. Motors provided in each part of the fuel cell system 10 (for example, a motor that powers pumps and the like except for the main drive motor 620), inverters for driving the motors, and various in-vehicle auxiliary machines (for example, an air compressor, an injector, a coolant circulation pump, a radiator, etc.) are collectively referred to as the auxiliary machine 640. Therefore, although illustrated independently in FIG. 1 and described independently in the description, the hydrogen pump 290, the air compressor 320, the water pump 525, a motor (not shown) for driving the radiator fan 535, and the like are also included in the auxiliary machine 640.

The control unit 700 controls the operations of the fuel gas supply circuit 200, the oxidant gas supply circuit 300, the exhaust gas circuit 400, and the cooling circuit 500. That is, the control unit 700 is driven by the power supply Vcc of a lead battery (not shown), and thus electric power is supplied to the control unit 700 even when the fuel cell system 10 is not operating.

Figure 2:
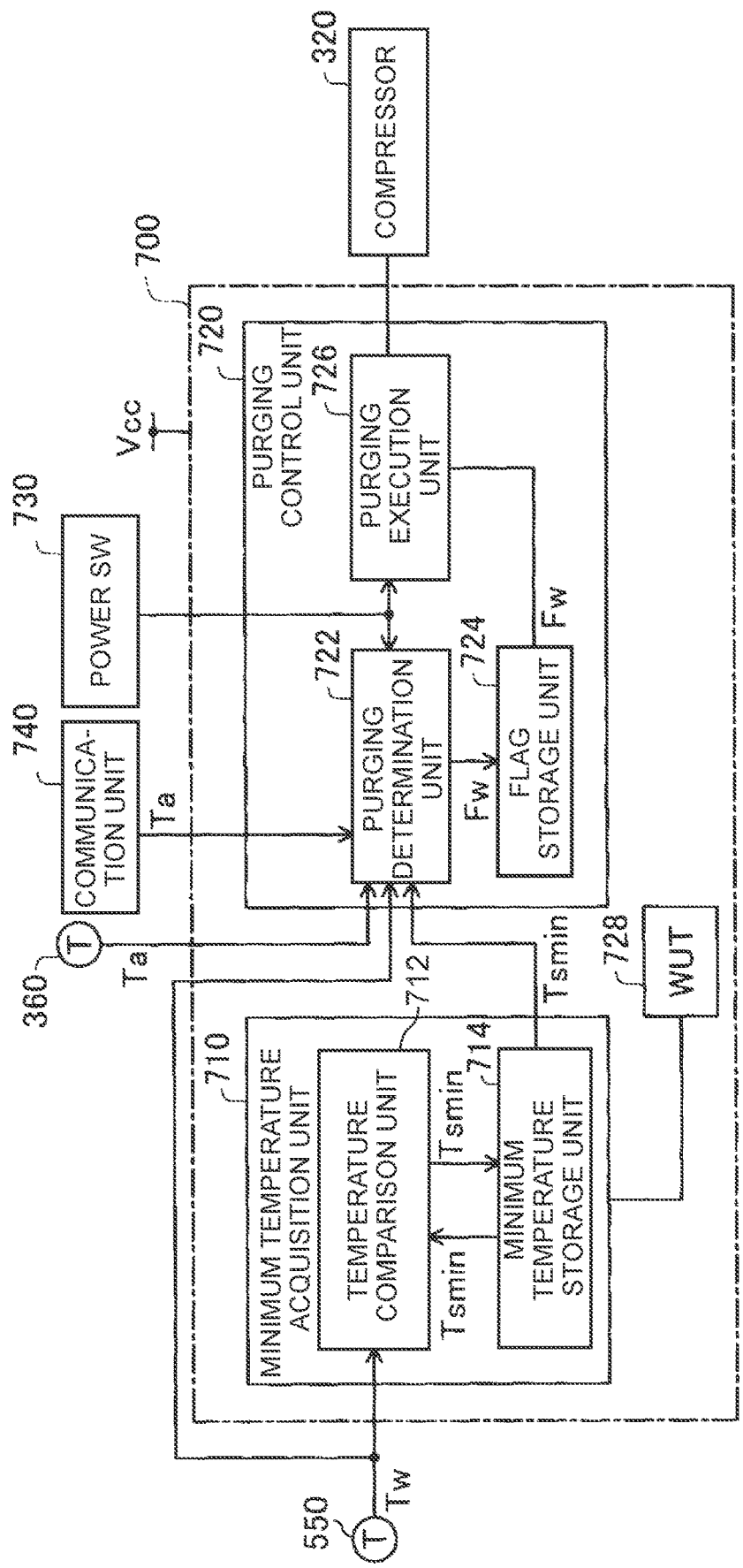
FIG. 2 is an explanatory diagram showing a configuration related to purging of a control unit.

FIG. 2 is an explanatory diagram showing a configuration related to purging of the control unit 700. The control unit 700 includes a minimum temperature acquisition unit 710, a purging control unit 720, and a wake-up timer 728. The minimum temperature acquisition unit 710 acquires the minimum temperature Tsmin at a predetermined specific position in the vehicle in which the fuel cell system 10 is mounted during soak while the fuel cell system 10 is stopped. The specific position is the outlet of the fuel cell 100 in the cooling circuit 500, and the temperature at the specific position is the temperature Tw of the coolant that is the cooling medium and is acquired by the temperature sensor 550 that is the temperature acquisition unit. The specific position may be the fuel cell 100 itself. In this case, the temperature at the specific position is the temperature Tf of the fuel cell 100 and is acquired by the temperature sensor 105. The minimum temperature acquisition unit 710 may set the outside air temperature Ta as the temperature at the specific position of the vehicle. Hereinafter, the specific position will be described as the outlet of the fuel cell 100 in the cooling circuit 500.

The minimum temperature acquisition unit 710 includes a temperature comparison unit 712 and a minimum temperature storage unit 714. The minimum temperature storage unit 714 stores the minimum temperature Tsmin at the specific position. The temperature comparison unit 712 compares the temperature Tw of the coolant with the minimum temperature Tsmin at the specific position stored in the minimum temperature storage unit 714, and stores the lower temperature as the minimum temperature Tsmin at the specific position in the minimum temperature storage unit 714. When the temperature Tw of the coolant and the minimum temperature Tsmin at the specific position stored in the minimum temperature storage unit 714 are equal, the temperature comparison unit 712 may maintain the minimum temperature Tsmin at the specific position in the minimum temperature storage unit 714 as it is, or may store the temperature Tw of the coolant as the minimum temperature Tsmin at the specific position in the minimum temperature storage unit 714.

The purging control unit 720 includes a purging determination unit 722, a flag storage unit 724, and a purging execution unit 726. When the power switch 730 is turned on and the fuel cell system 10 is operating, the purging determination unit 722 determines whether purging when the fuel cell system 10 is stopped next (hereinafter referred to as "purging at a stop") is necessary using the minimum temperature Tsmin at the specific position stored in the minimum temperature storage unit 714, the temperature Tw at the specific position, and the outside air temperature Ta. The flag storage unit 724 stores the determination result of the purging determination unit 722 as the flag Fw. The purging determination unit 722 may acquire the outside air temperature Ta from the outside air temperature sensor 360, or may acquire the outside air temperature Ta from the outside of the vehicle by using a communication unit 740 capable of communicating with the outside. For example, the outside air temperature Ta may be acquired from other vehicles in the vicinity and servers connected by a communication network via base stations for mobile phones and smartphones using vehicle-to-vehicle (V2V) services or vehicle-to-cellular-network (V2N) services. The configuration may be such that only one of the outside air temperature sensor 360 and the communication unit 740 is provided.

When the power switch 730 is turned off and the fuel cell system 10 is stopped, the purging execution unit 726 reads the value of the flag Fw stored in the flag storage unit 724, and when the flag Fw that requires the purging at the stop is set, that is, when the flag Fw is a value 1, drives the air compressor 320 and the hydrogen pump 290, opens the exhaust drain valve 440, and executes the purging at the stop. The wake-up timer 728 is a timer that wakes up the minimum temperature acquisition unit 710 at regular intervals.

Figure 3:
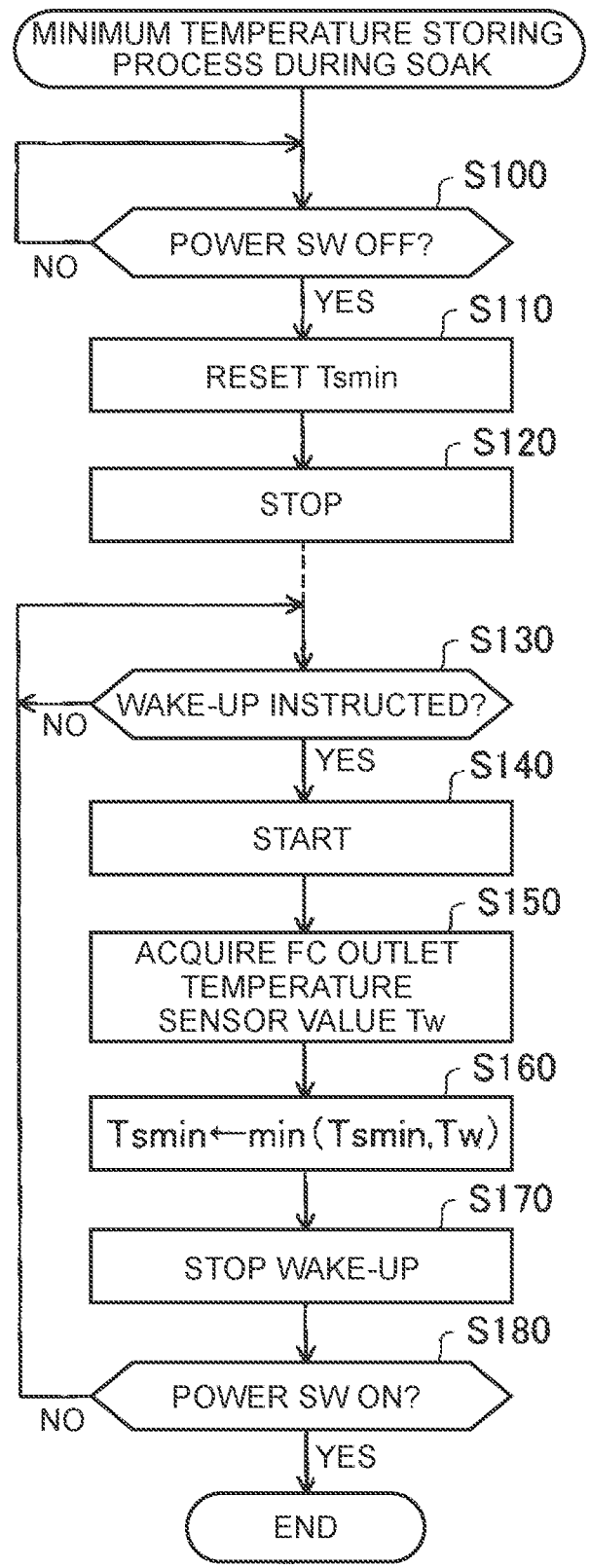
FIG. 3 is a process flowchart for storing a minimum temperature during soak executed by a minimum temperature acquisition unit.

FIG. 3 is a process flowchart for storing the minimum temperature during the soak executed by the minimum temperature acquisition unit 710. Upon receiving that the power switch 730 is turned off in step S100, the minimum temperature acquisition unit 710 proceeds to step S110 and resets the minimum temperature Tsmin at the specific position stored in the minimum temperature storage unit 714. The minimum temperature acquisition unit 710 sets the minimum temperature Tsmin as the temperature Tw of the coolant at the outlet of the fuel cell 100 in the cooling circuit 500 immediately before the power switch 730 is turned off. The minimum temperature acquisition unit 710 may set the minimum temperature Tsmin to a sufficiently high temperature that is not subjected to winter determination. The minimum temperature acquisition unit 710 then proceeds to step S120 and stops the process. Stopping the minimum temperature acquisition unit 710 means suspending the operation of the minimum temperature acquisition unit 710. In this state, the minimum temperature acquisition unit 710 is in a state where the minimum temperature acquisition unit 710 consumes almost no electric power. Such a suspension state can be achieved by making the internal operating clock frequency as close to zero as possible, or by saving the internal state in a non-volatile memory and completely turning off its power supply.

When the wake-up instruction is received from the wake-up timer 728 of the purging control unit 720 in step S130, the minimum temperature acquisition unit 710 wakes up in step S140. In the present embodiment, the wake-up means that a part of the configuration of the fuel cell system 10 temporarily starts the operation according to the instruction from the control unit 700. When the power switch 730 is turned off, the purging control unit 720 sends wake-up instructions to the minimum temperature acquisition unit 710 at predetermined time intervals. The predetermined time interval is, for example, one hour. The predetermined time interval may be a time shorter than one hour, for example 30 minutes, or a time longer than one hour, for example two hours.

In step S150, the minimum temperature acquisition unit 710 acquires the temperature Tw of the coolant at the outlet of the fuel cell 100 from the temperature sensor 550. In step S160, the minimum temperature acquisition unit 710 reads the minimum temperature Tsmin at the specific position stored in the minimum temperature storage unit 714, compares it with the temperature Tw of the coolant acquired in step S150, and stores the lower temperature as the minimum temperature Tsmin at the specific position in the minimum temperature storage unit 714. Immediately after the minimum temperature Tsmin at the specific position is reset, the temperature Tw of the coolant acquired in step S150 is stored in the minimum temperature storage unit 714 as the minimum temperature Tsmin at the fixed position. Subsequently, in step S170, the minimum temperature acquisition unit 710 stops the operation again and establishes the above-described suspension state.

When the power switch 730 is turned on in step S180, the process of storing the minimum temperature during the soak is stopped. If the power switch 730 is not turned on, the process proceeds to step S130, and the process is repeated in the same manner.

Figure 4:
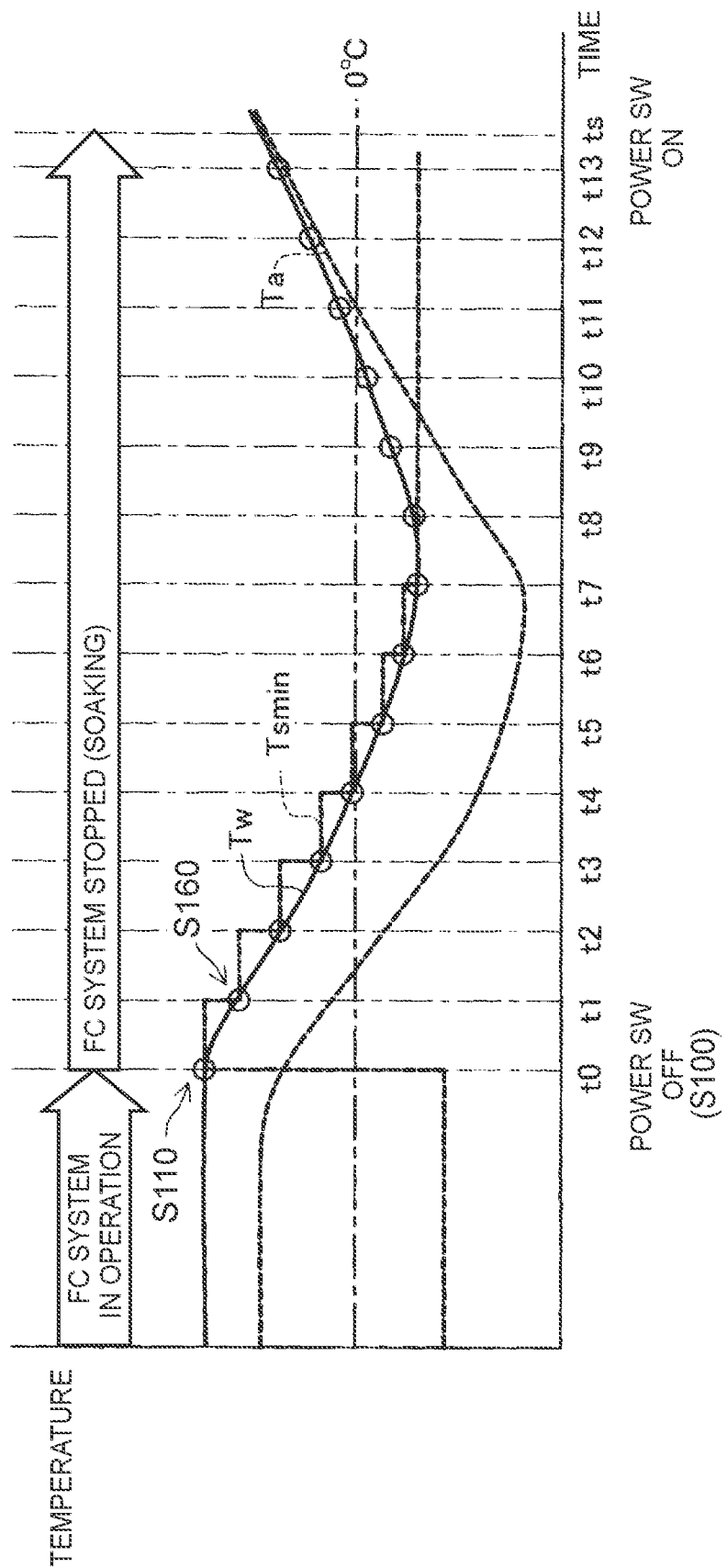
FIG. 4 is a graph showing a time change in a temperature of a coolant and an outside air temperature after a power switch is turned off.

FIG. 4 is a graph showing the time change in the temperature Tw of the coolant and the outside air temperature after the power switch 730 is turned off. The temperature Tw of the coolant at the outlet of the fuel cell 100 in the cooling circuit 500 tends to approach the outside air temperature Ta when the power switch 730 is turned off and the power generation of the fuel cell 100 is stopped.

When the power switch 730 is turned off at time t0 (step S100 in FIG. 3), the minimum temperature acquisition unit 710 resets the minimum temperature Tsmin stored in the minimum temperature storage unit 714, and stores the temperature Tw of the coolant at the outlet of the fuel cell 100 in the cooling circuit 500 immediately before the power switch 730 is turned off as the minimum temperature Tsmin in the minimum temperature storage unit 714.

At time t1, the minimum temperature acquisition unit 710 temporarily wakes up (steps 140 to S170 in FIG. 3). The minimum temperature acquisition unit 710 acquires the temperature Tw of the coolant at the outlet of the fuel cell 100 in the cooling circuit 500 (step S150 in FIG. 3), and stores the lower temperature of the coolant temperature Tw and the minimum temperature Tsmin as the minimum temperature Tsmin in the minimum temperature storage unit 714. In the example of FIG. 4, since Tw<Tsmin holds until time t7, the minimum temperature acquisition unit 710 stores the coolant temperature Tw as the minimum temperature Tsmin in the minimum temperature storage unit 714. Since Tsmin<Tw holds from time t8 to time is when the power switch 730 is turned on, the minimum temperature acquisition unit 710 maintains the minimum temperature Tsmin stored in the minimum temperature storage unit 714.

Figure 5:
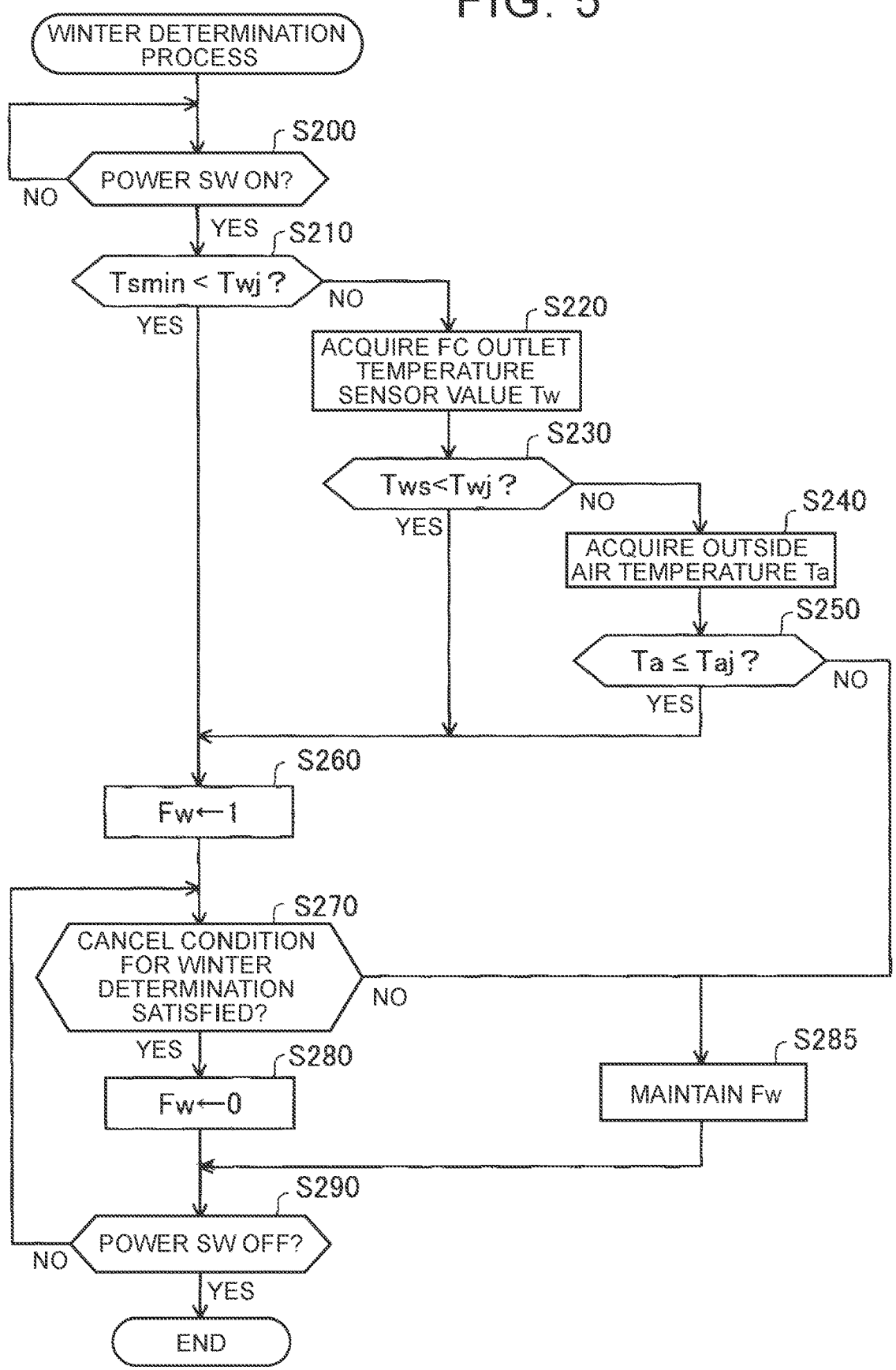
FIG. 5 is a process flowchart of winter determination.

FIG. 5 is a process flowchart of the winter determination executed by the purging determination unit 722. The purging determination unit 722 waits until the power switch 730 is turned on, and when the power switch 730 is turned on in step S200, the purging determination unit 722 proceeds to step S210.

In step S210, the purging determination unit 722 determines whether the minimum temperature Tsmin at the specific position is lower than the determination temperature Twj, and when the minimum temperature Tsmin at the specific position is lower than the determination temperature Twj, the process proceeds to S260, and when the minimum temperature Tsmin at the specific position is not lower than the determination temperature Twj, the process proceeds to step S220. The determination temperature Twj is, for example, 0° C., which is the freezing point of pure water. The determination temperature Twj may be higher or lower than 0° C. The freezing point of water in the fuel cell 100 may be lower than the freezing point of pure water due to depression of the freezing point. In such a case, the determination temperature Twj may be lower than 0° C.

In step S220, the purging determination unit 722 acquires the start temperature Tws of the coolant at the outlet of the fuel cell 100 at the time of starting the fuel cell system 10. In step S230, the purging determination unit 722 determines whether the start temperature Tws of the coolant is lower than the determination temperature Twj, and when the start temperature Tws of the coolant is lower than the determination temperature Twj, the process proceeds to step S260, and when the start temperature Tws of the coolant is not lower than the determination temperature Twj, the process proceeds to step S240.

In step S240, the purging determination unit 722 acquires the outside air temperature Ta. In step S250, the purging determination unit 722 determines whether the outside air temperature Ta is equal to or lower than the determination temperature Taj, and when the outside air temperature Ta is equal to or lower than the determination temperature Taj, the process proceeds to step S260, and when the outside air temperature Ta is higher than the determination temperature Taj, the process proceeds to step S285.

In step S260, the purging determination unit 722 performs the winter determination and sets the flag Fw. Specifically, the purging determination unit 722 sets the flag Fw stored in the flag storage unit 724 to the value 1. Here, the winter determination is a process of comprehensively determining that the vehicle is placed in a specific environment under seasonal conditions. The purging determination unit 722 sets the flag Fw to the value 1 when the winter determination is performed. In particular, the winter determination is not a process of determining that the season is "winter", but a process of determining comprehensive environmental conditions when various determinations and processes are performed as starting conditions for a fuel cell vehicle. The value of this flag Fw may be referred to in various processes including the purging process (FIG. 6) described later in control such as when the fuel cell is started.

In step S270, the purging determination unit 722 determines whether the cancel condition of the winter determination is satisfied. When the purging determination unit 722 satisfies the cancel condition of the winter determination, the process proceeds to step S280, and when the purging determination unit 722 does not satisfy the cancel condition of the winter determination, the process proceeds to step S285. Here, the cancel condition of the winter determination is, for example, a case where the outside air temperature Ta is 5° C. or higher and the vehicle travels at a speed of 30 km/h or more for 2 minutes or longer. The reason why the cancel condition of the winter determination is not composed of only the outside air temperature Ta is that, for example, when the vehicle travels indoors in a warm environment, the winter determination is canceled even when the outside air temperature outdoors is low. It is also unlikely that the vehicle travels indoors at a speed of 30 km/h or more for 2 minutes or longer, so if the vehicle can travel at a speed of 30 km/h or more for 2 minutes or longer, it can be determined that the vehicle is traveling outdoors. As can be understood from step S270, the purging determination unit 722 constantly monitors the outside air temperature Ta during traveling, and performs the cancelling determination for the winter determination.

In step S280, the purging determination unit 722 cancels the winter determination and unsets the flag Fw. Specifically, the purging determination unit 722 sets the flag Fw stored in the flag storage unit 724 to a value 0. In step S285, when the winter determination is performed, the winter determination is maintained, and when the winter determination is not performed, the state where the winter determination is not performed is maintained. Specifically, the purging determination unit 722 maintains the value of the flag Fw stored in the flag storage unit 724.

When the power switch 730 is turned off in step S290, the purging determination unit 722 ends the winter determination process.

FIG. 6 is a flowchart of the purging process executed by the purging execution unit 726. When the power switch 730 is turned on in step S300, the purging execution unit 726 proceeds to step S310.

In step S310, the purging execution unit 726 acquires the value of the flag Fw from the flag storage unit 724. In step S320, the purging execution unit 726 determines whether the flag Fw has the value 1. The purging execution unit 726 proceeds to step S330 when the flag Fw is the value 1, and proceeds to step S340 when the flag Fw is not the value 1, that is, when the value is 0.

In step S330, the purging execution unit 726 opens the inlet valve 340 and the pressure regulating valve 420, drives the air compressor 320, and executes the purging at the stop. Subsequently, the drive of the air compressor 320 is stopped, and the inlet valve 340 and the pressure regulating valve 420 are closed.

In step S340, the control unit 700 shuts down the fuel cell system.

As described above, in the present embodiment, the control unit 700 acquires the minimum temperature Tsmin of the coolant temperature Tw at the outlet of the fuel cell 100 during the soak in the state where the power switch 730 is turned off, and performs the winter determination in the state where the power switch 730 is turned on. The control unit 700 determines whether the purging at the stop is necessary using the result of the winter determination when the power switch 730 is turned off next. Therefore, even when there is a high possibility that the fuel cell system 10 cools down while the fuel cell system 10 is stopped, the purging at the stop can be executed.

In the present embodiment, after the power switch 730 is turned off, the purging execution unit 726 executes purging at the stop, and then the control unit 700 shuts down the fuel cell system 10. In this way, even when the fuel cell system 10 cools down while the fuel cell system 10 is stopped, the fuel cell 100 can be purged before the water in the fuel cell 100 freezes. When the power switch 730 is turned off, the control unit 700 may shut down the fuel cell system 10 without executing the purging at the stop, and execute the purging at the stop when a predetermined time has elapsed after the shutdown.

In the present embodiment, the purging execution unit 726 executes purging at the stop when the flag Fw is the value 1, and does not execute purging at the stop when the flag Fw is not the value 1. However, the purging execution unit 726 may change the intensity of the purging at the stop so as to execute a strong purging at the stop with a high rotation speed of the air compressor 320 when the flag Fw is the value 1, and execute a weak purging at the stop with a low rotation speed of the air compressor 320 when the flag Fw is not the value 1.

In the present embodiment, the specific position is the outlet from which the coolant is discharged from the fuel cell in the cooling circuit 500, but the specific position may be the fuel cell stack 100 itself or a position where the outside air temperature can be measured. For example, in addition to the outside air temperature sensor 360, the outside air temperature may be acquired from the outside air temperature sensor of the air conditioner.

In the present embodiment, the purging determination unit 722 determines whether the purging at the stop is necessary by using the minimum temperature at the specific position during the soak. However, the purging determination unit 722 may use a transition of the temperature at the specific position to estimate the minimum temperature at the specific position and use the estimated minimum temperature to determine whether the purging at the stop is necessary. Specifically, the purging determination unit 722 may acquire three or more temperatures at the specific position and extrapolate the temperatures to estimate the minimum temperature.

In the above fuel cell system 10, it has been described that the fuel cell system 10 is started and stopped based on the input to the power switch 730, but the fuel cell system 10 may be started and stopped by another controller.

In the above embodiment, when the minimum temperature acquisition unit 710 acquires the outside air temperature Ta via the communication unit 740, the minimum temperature acquisition unit 710 may acquire the outside air temperature Ta from an external facility or other vehicles in the vicinity.

The present disclosure is not limited to the above embodiment and can be carried out with various configurations without departing from the spirit and scope of the present disclosure. For example, the technical features in the embodiment corresponding to the technical features in the aspects described in SUMMARY may be replaced or combined as needed to solve part or all of the above-described inconvenience or to achieve part or all of the above-described advantageous effects. These technical features may be omitted as appropriate unless described as essential in the specification.

What is claimed is:

1. A control method of a fuel cell system comprising acquiring at least one a temperature at a specific position in a vehicle equipped with the fuel cell system from when the fuel cell system is stopped until the fuel cell system is started again, and using the temperature at the specific position to determine whether to execute purging a next time the fuel cell system is stopped.

\* \* \* \* \*